United States Patent [19]
Kaku et al.

[11] Patent Number: 5,702,062
[45] Date of Patent: Dec. 30, 1997

[54] TAPE CASSETTE

[75] Inventors: Nobuyuki Kaku, Kanagawa; Seiji Ono, Yokohama; Yoshimi Maehara, Ootsu; Mikihisa Inoue, Kyoto, all of Japan

[73] Assignees: Hitachi Maxell, Ltd., Osaka; Hitachi, Ltd., Tokyo, both of Japan

[21] Appl. No.: 607,524

[22] Filed: Feb. 27, 1996

Related U.S. Application Data

[63] Continuation of Ser. No. 359,849, Dec. 20, 1994, abandoned, which is a continuation of Ser. No. 106,999, Aug. 17, 1993, abandoned.

[51] Int. Cl.$^6$ ..................................................... G11B 23/04
[52] U.S. Cl. ..................... 242/338.4; 242/347; 242/348; 360/132
[58] Field of Search ........................... 242/338.4, 347, 242/348; 360/132; 352/78 R

[56] References Cited

U.S. PATENT DOCUMENTS

| | | | |
|---|---|---|---|
| 3,980,255 | 9/1976 | Serizawa | 242/198 |
| 4,268,877 | 5/1981 | Moris et al. | 360/132 X |

OTHER PUBLICATIONS

SMPTE Journal, Mar. 1986, pp. 358–374 (cited in Specification).

*Primary Examiner*—John Q. Nguyen

[57] ABSTRACT

A tape cassette which can maintain stably the accuracy of the reference planes for determining the height of the tape cassette and which allows enhancement in accuracy of positioning, height positioning reference planes being provided inwardly a specified distance apart from an outside casing surface of the tape cassette such that the reference plane for determining the height of the tape cassette relative to the apparatus is not provided on the outside casing surface of the tape cassette, thus the reference planes remain free from contact with any mechanism for loading the tape cassette or with any foreign matter in transport. Thus, the reference planes can be kept free from damage.

6 Claims, 6 Drawing Sheets

TAPE CASSETTE

This application is a continuation, of application Ser. No. 08/359,849 filed on Dec. 20, 1994, which is a continuation of Ser. No. 08/106,999 filed on Aug. 17, 1993 now both abandoned.

BACKGROUND OF THE INVENTION

1. Field of the Invention

The present invention relates to a tape cassette, and more particularly, to a shape of its positioning part suitable for the improvement of positioning accuracy in loading the tape cassette to a magnetic recording/reproducing apparatus.

2. Related Art

The tape cassette with built-in reels for winding a magnetic tape, when loaded to an apparatus which performs recording and reproduction, is positioned in a way that the reels and the tape cassette casing are positioned independently of each other. That is, the reels are positioned by a reel base of the apparatus, and the tape cassette casing is positioned by a positioning member of the apparatus.

In conventional tape cassettes, the plane or hole by which a tape cassette casing is positioned is generally provided to the outermost side face, i.e. the lowest face of the casing, for example as in the D1 or D2 tape cassette described in "*SMPTE Journal*," Mar. 1986, pp. 358–374. Such a configuration is simplest in construction. Also, such a configuration allows the reference plane or hole to be provided without being much affected by the internal construction, thus suitable for offering thinner tape cassettes.

However, in the above described prior art, accuracy of the reference plane of the tape cassette, especially retention of the accuracy has not been taken into consideration. More specifically, the tape cassette is normally loaded on the apparatus by a cassette loading mechanism. When this is done, the casing surface of the tape cassette is put into sliding contact with the cassette loading mechanism. Repeating such action makes the cassette surface vulnerable to damage. Further, the casing surface is likely to make contact with any foreign matter in transport of the tape cassette or other handling, which could easily lead to a deterioration in surface accuracy. If surface accuracy of the reference plane of the tape cassette deteriorates, the tape cassette, when loaded on the apparatus, will result in an incorrect positioning of the tape cassette relative to the apparatus, in which case the tape cassette can no longer be loaded horizontally. As a result, the reels may come into rubbing contact with the casing at the inside of the tape cassette, or the accuracy of the tape guide inside the tape cassette may be negatively effected, resulting in an unstable tape running.

Meanwhile, in recent years, VTRs have been widely used as mini-movies, and increasingly used outdoors. Under such use environments, there is a demand for heavy duty type tape cassettes that will not be damaged even if dropped, besides the need for dust-proof and drip-proof features. Considering such demands from the market, the aforementioned prior art has now been able to provide sufficient adjustments.

SUMMARY OF THE INVENTION

Accordingly, the object of the present invention is to provide a tape cassette which can solve these and other problems and which allows the plane for positioning the cassette to be maintained at high accuracy and ensure the strength of the casing.

The present invention is characterized in that the reference plane for positioning in the heightwise direction of the tape cassette is provided in a plane a specified amount apart from the outermost surface of the casing.

On the bottom face of the tape cassette, there is partly provided a first recess apart from the bottom face by a specified amount. The first recess is in turn provided with a second recess within a plane. A positioning member by which the tape cassette is positioned in the heightwise direction when loaded in the apparatus is formed so as to be smaller than the first recess, where axial positioning is done by the inner bottom plane of the first recess. Also, a positioning member by which in-plane positioning of the tape cassette is done is to be fitted to the second recess provided within the first recess. This allows the tape cassette positioning to be accomplished not by the outermost surface of the casing but by an internal plane a specified amount apart therefrom.

The objects of the present invention are fulfilled by providing a tape cassette positioning system comprising: a tape cassette shell; and a magnetic recording/playback apparatus. The recording/playback apparatus includes at least a first and second positioning pin against which is placed the shell when the shell is inserted into a cavity within the recording/playback apparatus. The shell includes: a casing for housing tape reels, said casing including on a bottom face thereof; a two-stage recess for positioning said tape cassette shell in the magnetic recording/reproducing apparatus by receiving the first positioning pin thereof; and a one-stage recess for constraining an ultimate depth to which said tape cassette shell is positioned on said recording/reproducing apparatus via receiving the second positioning pin. The two-stage recess includes: a first stage having a recess plane surface at a first depth relative to the bottom face of the casing; and a second stage, located within said first stage, having a positioning portion having a deeper recess relative to the bottom face of the casing than said first stage of said one stepped reference recess. The first positioning pin, corresponding to said two-stage stepped reference recess, includes: an upper part for precisely positioning said casing of said tape cassette shell on said recording/reproducing apparatus via insertion into the second stage of the two-stage recess; and a lower part commensurate in height to said first depth of the first stage of said two-stage recess.

In the a tape cassette positioning system of the present invention, an area of the recess plane surface of the first stage of the two-stage recess is greater than a first area, of said imaginary plane parallel to said recess plane surface of said first stage of the two-stage recess, defined by a perimeter of the lower part of the first positioning pin such that a gap is formed therebetween. A second area, of said imaginary plane parallel to said recess plane surface of said first stage of the two-stage recess, defined by the second stage of the two-stage recess is commensurate with a third area, of an imaginary plane parallel to said recess plane surface of said first stage of the two-stage recess, defined by a perimeter of the upper part of the first positioning pin such that substantially no gap is formed therebetween.

The objects of the present invention are also achieved by providing a magnetic tape cassette shell for forming a cassette tape. The cassette tape is to be used with a magnetic recording/playback device and is to be drawn into a cavity within the record/playback device and positioned against a first and a second positioning pin. Each pin extends from the record/playback device. The first pin is stepped in shape by an arrangement of a first and second portion thereof. The first portion of the pin is distal to a base of the pin where the pin is attached to the recording/playback device, and has a first perimeter. The second portion of the pin is adjacent to the first portion and has a second perimeter greater than the first perimeter. The first pin has a flat shoulder surface between the second perimeter and the first perimeter, the shoulder surface being substantially perpendicular to the length of the pin. The shell includes: a casing having a two-stage recess therein for receiving the first pin. The two-stage recess includes a first stage and a second stage. The first stage is closer to a face of the casing than the second stage. A distal end, relative to the face of the casing, of the first stage of the two-stage recess forms a flat shoulder surface that corresponds to the shoulder surface of the first pin. The shoulder surface of the first stage is placed against the shoulder surface of the first pin thereby fixing a minimal distance between the two-stage recess and the base of the pin.

In the magnetic tape cassette shell of the present invention, an area of the shoulder surface of the first stage is greater than a first area, of an imaginary plane parallel to said shoulder surface, defined by the perimeter of the second portion of the first pin such that a gap is formed therebetween. A distal end, relative to the face of the casing, of the second stage is deeper than the distal end of the first stage. A second area, of said imaginary plane parallel to said shoulder surface, defined by the second stage is commensurate with a third area, of said imaginary plane parallel to said shoulder surface, defined by the perimeter of the first portion of the first pin such that substantially no gap is formed therebetween, thereby fixing a position of the first stage in a plane parallel to the shoulder surface of the pin.

DETAILED DISCUSSION

Figure 1:
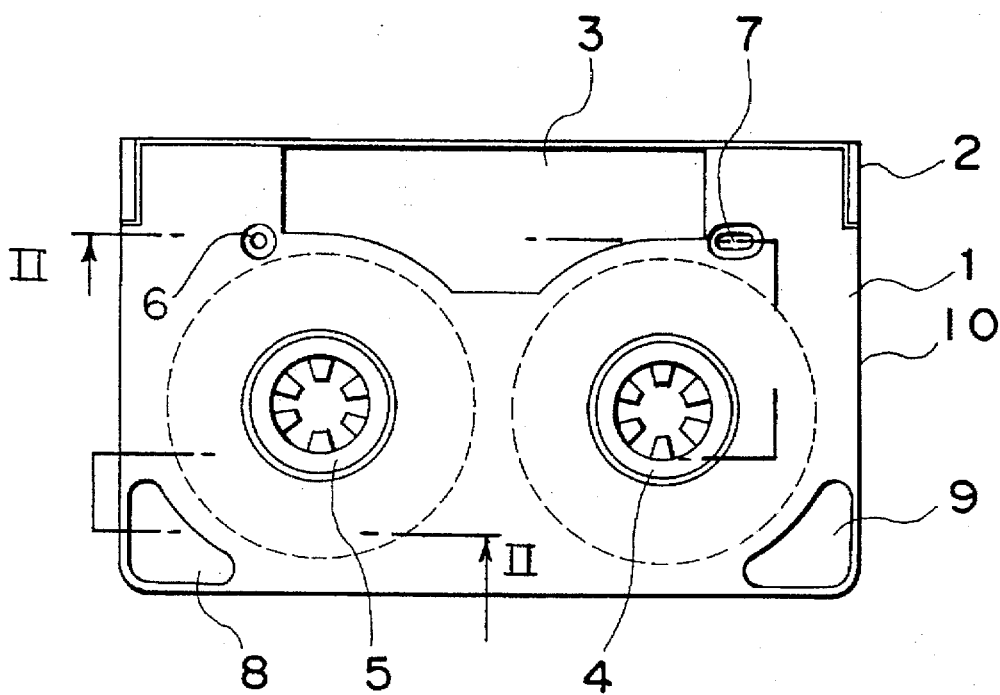
FIG. 1 is a bottom view of a tape cassette according to the present invention.

Embodiments of the present invention are now described in detail with reference to FIGS. 1 through 11. FIG. 1 is a bottom view of one embodiment of the tape cassette according to the present invention. There is seen a tape cassette 10, including a lower casing 1; a cover 2 for covering the front face of the tape cassette 10 and, an opening 3 formed by the lower casing 1 and the cover 2, into which opening 3 a tape guide is inserted for removing the tape in the loading state. A supply side reel 4 and take-up side reel 5 are provided, both for winding the tape within the tape cassette 10, where a drive unit in the form of a reel base faces outside through the opening provided to the lower casing 1. The lower casing 1 is also provided with reference holes 6 and 7 in proximity to the opening 3. Further, recesses 8 and 9 are provided at corners opposite to the opening 3 with the reels 4 and 5 interposed therebetween. In the present embodiment, these reference holes 6, 7 and recesses 8, 9 are located at such positions as not to overlap with the hub diameter of the reels, thus not providing an obstacle to thinning the tape cassette.

Figure 2:
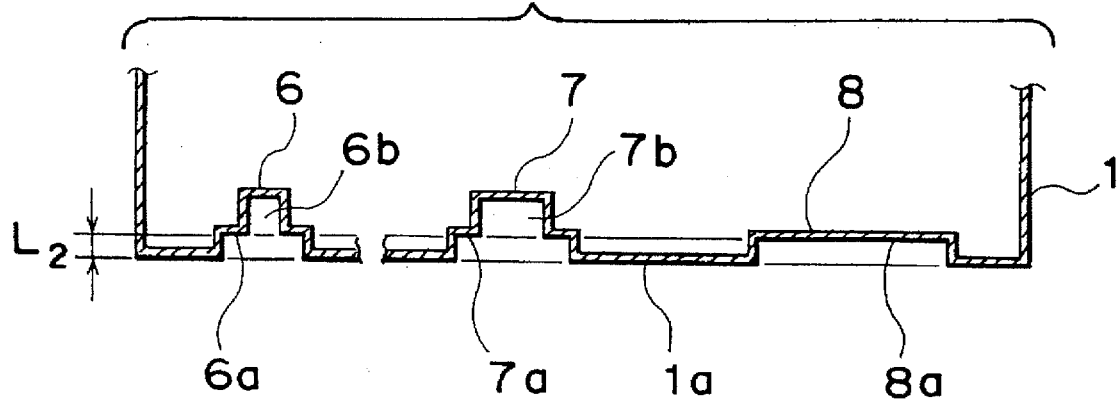
FIG. 2 is a sectional side view showing the recesses of the tape cassette along the section line II—II of FIG. 1.

FIG. 2 is a sectional side view showing sections of the aforementioned reference holes and recesses. On a bottom face 1a of the lower casing 1, there are provided various recesses, sections of which are shown in a row in FIG. 2. The reference hole 6 is comprised of two-stage recesses, where a height positioning reference plane 6a is provided in the recess that comes first from the bottom face 1a, and a recess 6b is provided deeper thereof. The recess 6b is formed into an approximately circular shape. Similarly, the reference hole 7 is also comprised of two-stage recesses, where a height positioning reference plane 7a is provided in the recess that comes first from the bottom face 1a, and a recess 7b is provided deeper thereof. The recess 7b is formed into an approximately elliptic shape. The recess 8 is comprised of a one-stage recess having a height positioning reference plane 8a. The recess 9 is also of a similar shape. The aforementioned height positioning reference planes 6a, 7a, and 8a are preferably provided in equal height ($L_2$). This allows the height reference planes to be flush with one another, making it easier to ensure the accuracy.

Figure 3:
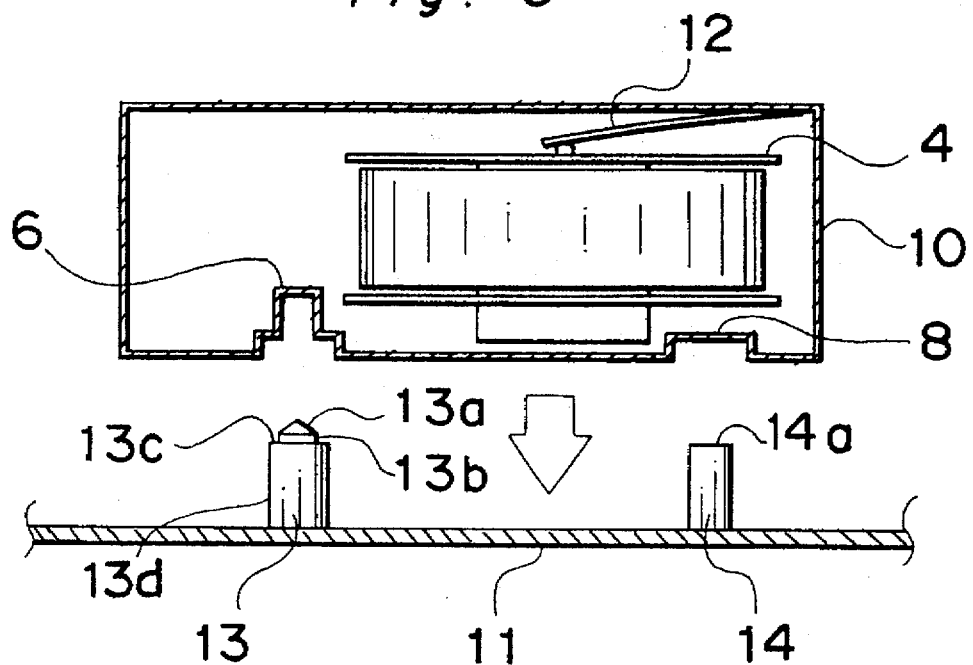
FIG. 3 is a side view showing a state before the tape cassette is loaded.
Figure 4:
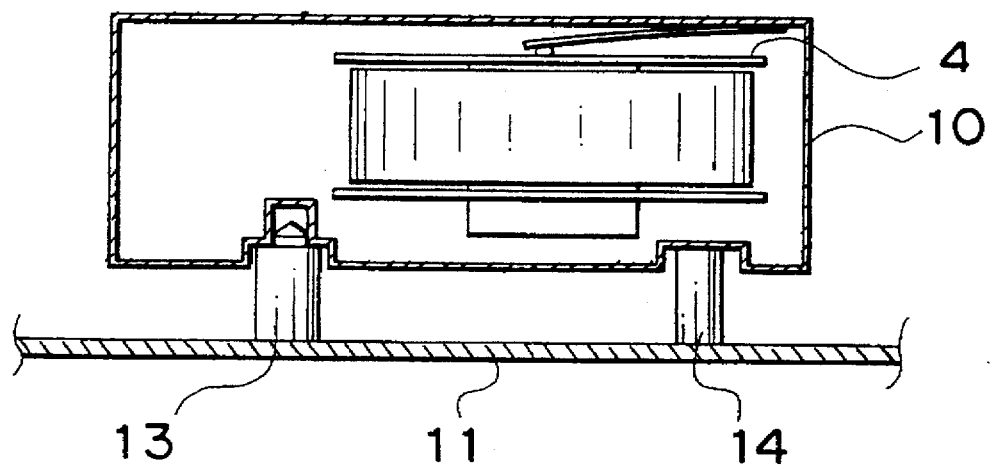
FIG. 4 is a side view showing a state in which the tape cassette is loaded.

Next illustrated is the state in which the tape cassette 10 is loaded to an apparatus. FIG. 3 shows a state before loading, and FIG. 4 shows another after loading. The supply side reel 4 within the tape cassette 10 is restricted in movement in the axial direction by a hold-down spring 12. A chassis 11 has a positioning pin 13 and a height positioning pin 14 fixed thereon. The positioning pin 13, which is of a stepped shape, has at its upper part an approximately conical guide portion 13a and a cylindrical positioning portion 13b downward adjoining thereto, and at its lower part a cylindrical portion 13d provided with a cassette rest-on surface 13c on its top face. At the top end of the height positioning pin 14, a cassette rest-on surface 14a is provided. When the tape cassette moves in the direction as indicated by the arrow in FIG. 3, there will occur a loading state as shown in FIG. 4. The guide portion 13a of the pin 13 determines an approximate position of the tape cassette relative to the chassis by fitting the recess 6b of the reference hole 6, and then the tape cassette is precisely positioned by the mating of the positioning portion 13b and the recess 6b. Also, the cassette rest-on surface 13c of the pin 13 contacts the height positioning reference plane 6a of the reference hole 6, thereby determining the height of the tape cassette. Another similar positioning pin, although not shown, is in correspondence to the reference hole 7, and in cooperation with the reference hole 6, determines the in-plane position of the tape cassette relative to the chassis. The cassette rest-on surface 14a is contacted with the height positioning reference plane 8a, and in cooperation with the cassette rest-on surface 13c, determines the height of the tape cassette.

Further, the recesses 8 and 9 as shown in this embodiment, for which a specified area can be ensured, may also lend themselves, for example, to use for an auto-changer grip or the like.

Figure 5:
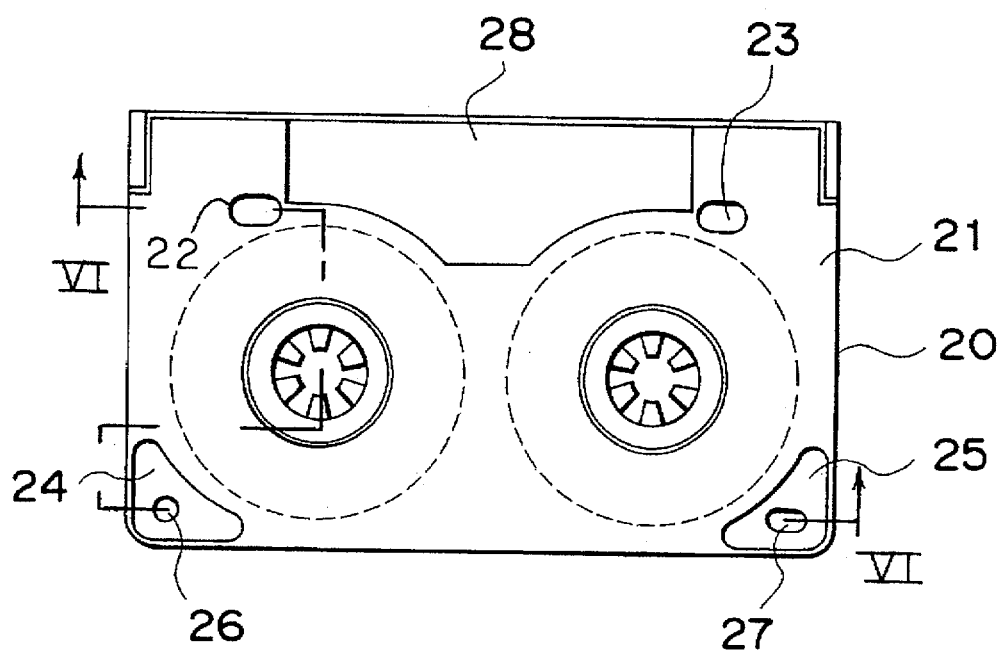
FIG. 5 is a bottom view of a tape cassette according to another embodiment of the present invention.
Figure 6:
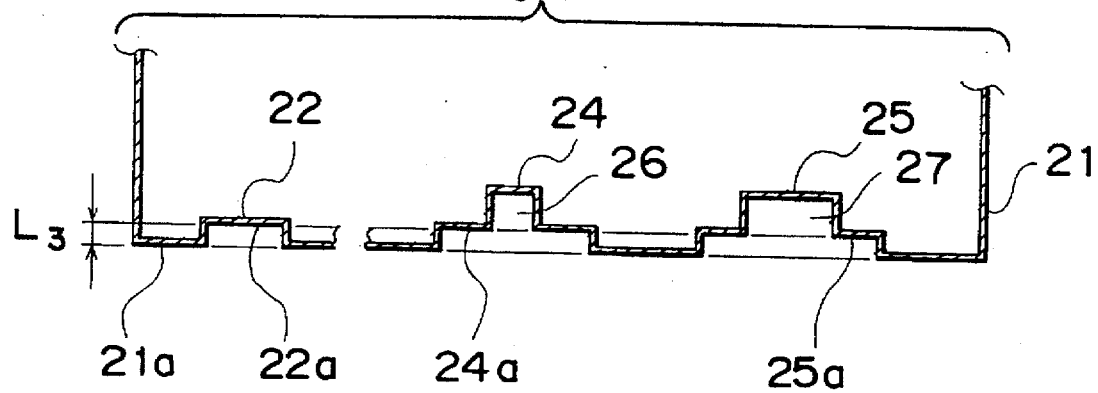
FIG. 6 is a sectional side view showing the recesses of the tape cassette along the section line VI—VI of FIG. 5.

Another embodiment of the invention is now described with reference to FIGS. 5 and 6. FIG. 5 is a bottom view of a tape cassette, and FIG. 6 is a sectional side view thereof. A lower casing 21 of the tape cassette 20 is provided with recesses 22 and 23 in proximity to its opening 28. The lower casing also has recesses 24 and 25 provided downward at both corners thereof. Further, the recess 24 has a reference hole 26 provided therein, and the recess 25 has a reference hole 27 provided therein. The reference hole 26 is formed into an approximately circular shape and the reference hole 27 is into an approximately elliptic shape. The reference holes 26 and 27 are to have the aforementioned positioning pin 13 as shown in FIG. 3 inserted thereinto, and the recesses 22 and 23 are to have the height positioning pin 14 engaged therein. Height positioning reference planes 22a, 24a, and 25a provided in the recesses are arranged to be equal in height ($L_3$) to a bottom face 21a of the lower casing 21.

Figure 7:
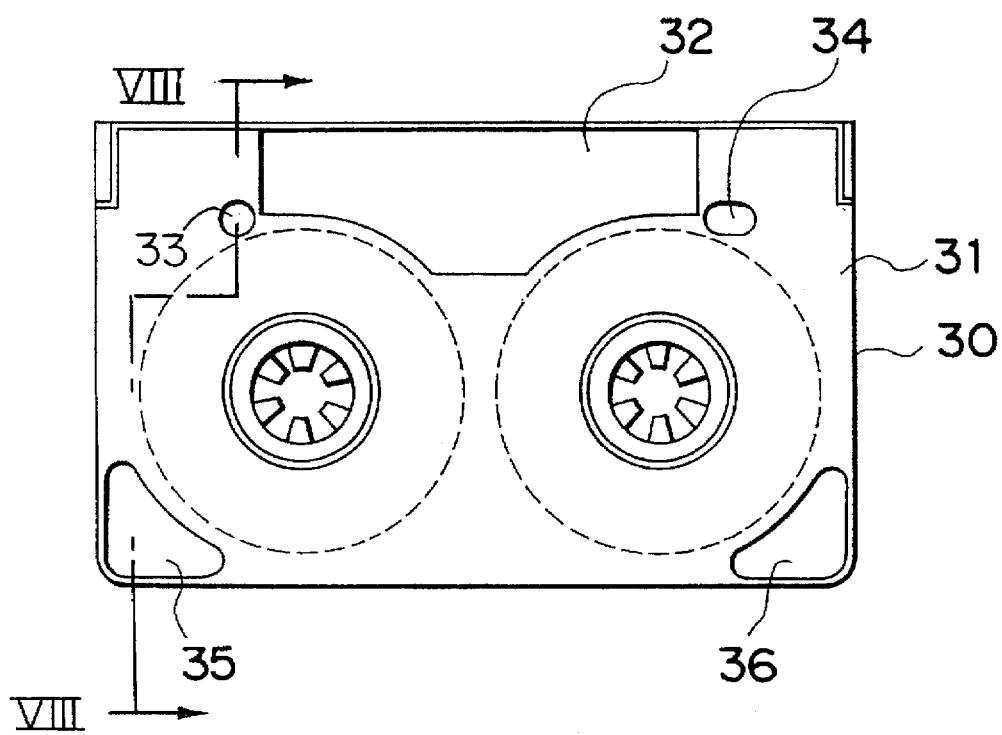
FIG. 7 is a bottom view of a tape cassette according to still another embodiment of the present invention.
Figure 8:
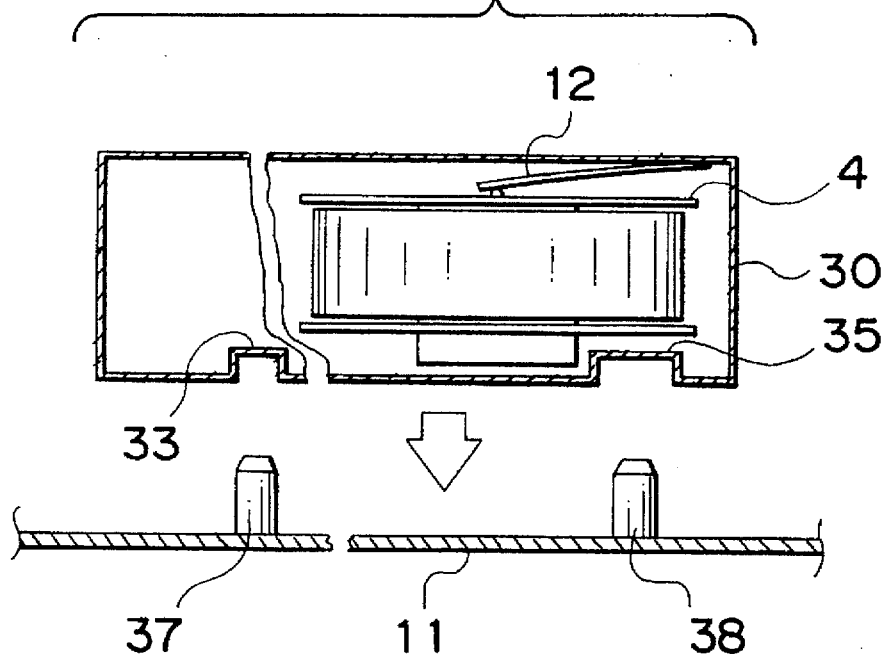
FIG. 8 is a side view showing a state before the tape cassette, along the section line VIII—VIII of FIG. 7, is loaded.
Figure 9:
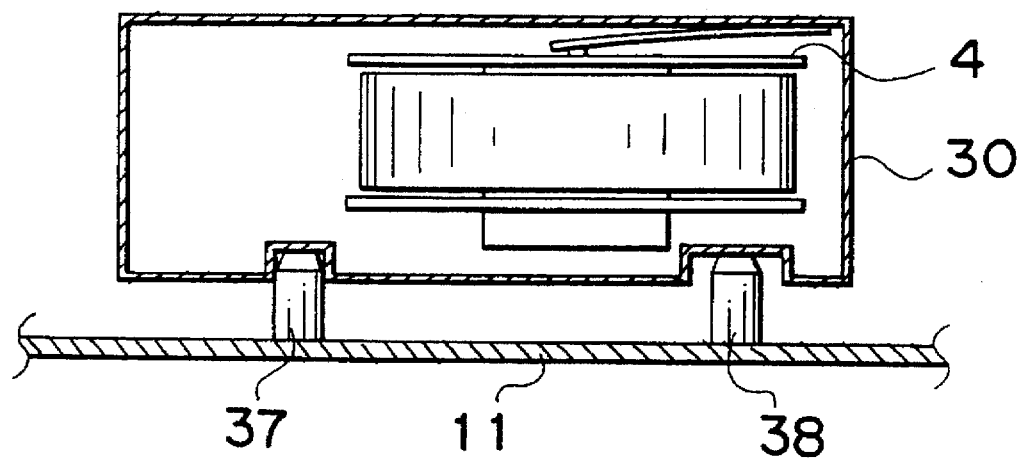
FIG. 9 is a side view showing a state in which the tape cassette is loaded.

Next, still another embodiment of the invention is described with reference to FIGS. 7 to 9. FIG. 7 is a bottom view of a tape cassette, FIG. 8 is a side view of a state before loading, and FIG. 9 is a side view of a state after loading. A lower casing 31 of a tape cassette 30 is provided with recesses 33, 34, 35, and 36. The recesses 33 and 34 are located in proximity to an opening 32 and the recesses 35 and 36 are at corners opposite to the opening with reels interposed therebetween. The recess 33 is formed into an approximately circular shape, and the recess 34 is into an approximately elliptical shape. Also, the recesses 35 and 36 have a specified size. As shown in FIG. 8, the chassis 11 has a positioning pin 37 and a height positioning pin 38 fixed thereon. These pins are of the same shape, having a little taper at the end, thus allowing the same parts to be used therefor. When the tape cassette in the state as shown in FIG. 8 is loaded to the apparatus into the state as shown in FIG. 9, the positioning pin 37 is inserted into the recesses 33 and 34. The inner diameter of the recess 33 and the width of the recess 34 are approximately equal to the outer diameter of the positioning pin 37, so that the tape cassette 30 is determined in position. Further, the height positioning pin 38 is engaged in the recesses 35 and 36. According to the present embodiment, positioning pins can be shared in common use, and the tape cassette can be simplified in configuration.

Figure 10:
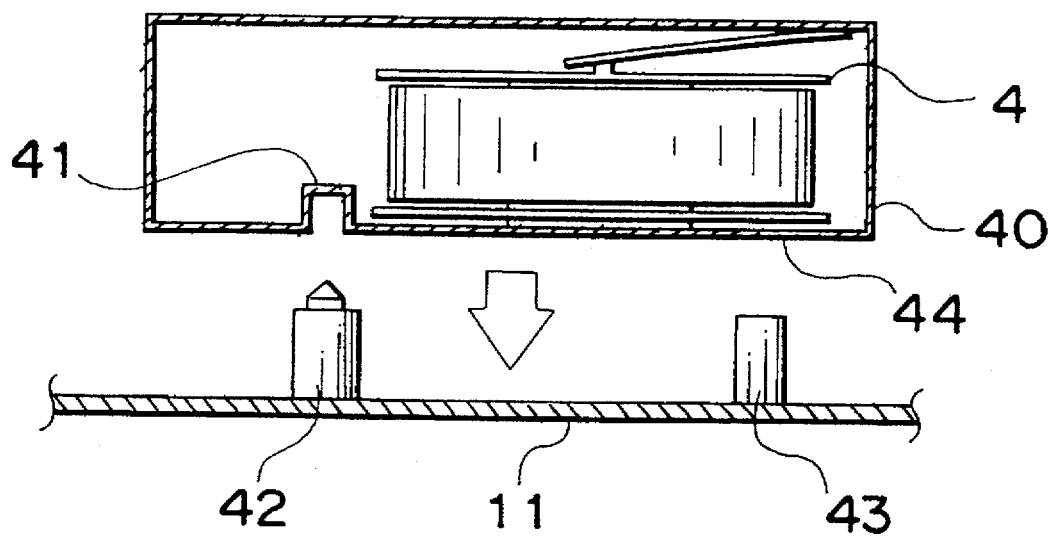
FIG. 10 is a side view showing a state before a conventional cassette is loaded.
Figure 11:
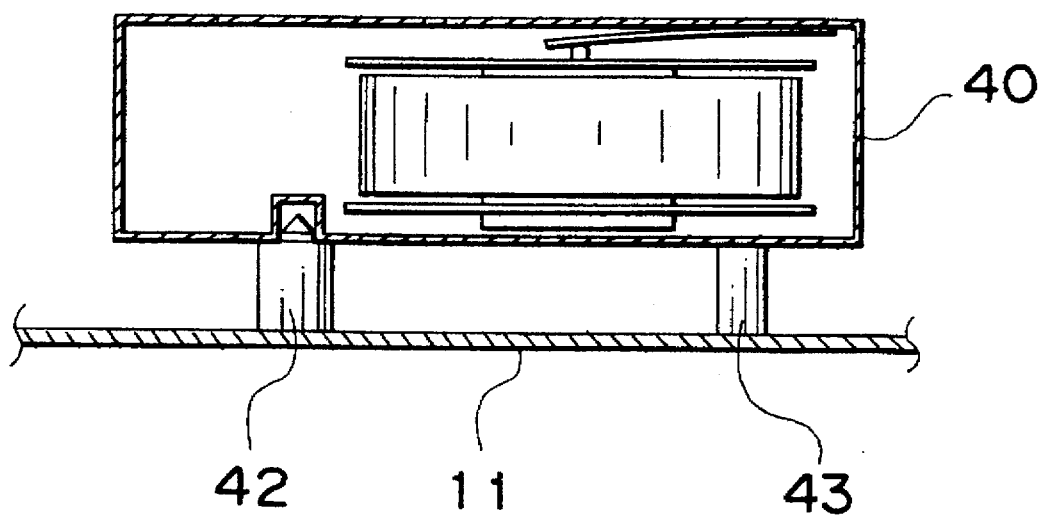
FIG. 11 is a side view showing a state in which the conventional cassette is loaded.

Next described is application of the embodiments of the invention. FIGS. 10 and 11 show an ordinary tape cassette of a thinner type than that described in the present invention. FIG. 10 illustrates a state before the tape cassette is mounted onto the chassis, while FIG. 11 illustrates a state in which the tape cassette has been mounted onto the chassis. A tape cassette 40 with a built-in supply side reel 4 has a reference hole 41 at its bottom face 44. The chassis 11 is provided with a positioning pin 42 and a height positioning pin 43. The positioning pin 42 is to be fitted to the reference hole 41, thereby determining the position of the tape cassette. The height positioning pin 43 is to support a specified position of the tape cassette, thereby determining the height of the tape cassette. In this case, the reference plane for height of the tape cassette is the bottom face 44. In contrast to this, as shown in FIG. 2 and other FIGS. illustrating the embodiments of the invention, with a tape cassette 10 thicker than the tape cassette 40, if the distance $L_2$ between the bottom face 1a and the height positioning reference planes 6a, 7a, and 8a is equal to the difference in thickness between the aforementioned tape cassettes, then the height of the tape cassettes can be made equal to each other relative to the chassis while the positioning pins 13 and 42 and the height positioning pins 14 and 43 are of the same shape. That is, it is possible to cope with a tape cassette of the same mechanism and a different thickness. Therefore, a rib or the like for ensuring strength may be provided inside a thick tape cassette.

According to the present invention, since the height positioning reference planes of the tape cassette will never be exposed through the bottom face of the tape cassette, the reference planes can remain free from damage by some mechanism or foreign matter in handling of the tape cassette, ensuring accuracy of the height positioning reference planes.

The present invention being thus described, it will be obvious that the same may be varied in may ways. Such variations are not to be regarded as a departure from the spirit and scope of the invention, and all such modifications as would be obvious to one skilled in the art are intended to be included within the scope of the following claims.

What is claimed is:

1. A tape cassette positioning system comprising:
   a tape cassette shell; and
   a magnetic recording/playback apparatus, the recording/playback apparatus including at least a first and second positioning pin against which is placed the shell when the shell is inserted into a cavity within the recording/playback apparatus;
   wherein the shell includes:
   a casing for housing tape reels, said casing including on a bottom face thereof:
      a two-stage recess for positioning said tape cassette shell in the magnetic recording/reproducing apparatus by receiving the first positioning pin thereof; and
      a one-stage recess for constraining an ultimate depth to which said tape cassette shell is positioned on said recording/reproducing apparatus via receiving the second positioning pin;
      wherein said two-stage recess includes:
         a first stage having a recess plane surface at a first depth relative to the bottom face of the casing; and
         a second stage, located within said first stage, having a positioning portion having a deeper recess relative to the bottom face of the casing than said first stage of said two-stage recess;
   wherein the first positioning pin, corresponding to said two-stage stepped reference recess, includes:
      an upper part for precisely positioning said casing of said tape cassette shell on said recording/reproducing apparatus via insertion into the second stage of the two-stage recess; and
      a lower part having a surface parallel with and mating with the first stage of said two-stage recess;
   wherein a perimeter of the lower part of the first positioning pin does not fit snugly against a lateral wall of said first stage of the two-stage recess such that a gap is formed therebetween; and
   wherein a perimeter of the upper part of the first positioning pin fits snugly into the recess of said second stage of the two-stage recess such that substantially no gap is formed therebetween.

2. The tape cassette positioning system as in claim 1, wherein two two-stage recesses are provided on said bottom face of said casing for cooperating with two corresponding positioning pins of the magnetic recording/reproducing apparatus.

3. The system as in claim 1, wherein:

a first depth of said recess plane surface of said first stage of said two-stage recess is the same depth as a recess plane surface of said one-stage recess; and wherein said second positioning pin, corresponding to said one-stage recess, is equal in height to said lower part of said first positioning pin.

4. The tape cassette positioning system as in claim 1, wherein:

said recess plane surface of said first stage of said two-stage recess constraining a depth to which said tape cassette can be positioned on said recording/reproducing apparatus; and said second stage positioning portion, having said deeper recess, is for constraining lateral positioning of said tape cassette on said recording/reproducing apparatus.

5. A magnetic tape cassette shell having a magnetic tape for forming a tape cassette, the cassette tape being used with a magnetic recording/playback device, the cassette being drawn into a cavity within the record/playback device and positioned against a first and a second positioning pin, each pin extending from the record/playback device, the first pin being stepped in shape by an arrangement of a first and second portion thereof, the first portion of the pin being distal to a base of the pin where the pin is attached to the recording/playback device, the first portion having a first perimeter, and the second portion of the pin being positioned between the first portion and the base and also having a second perimeter greater than the first perimeter, the first pin having a flat shoulder surface between the second perimeter and the first perimeter, the shoulder surface being substantially perpendicular to the length of the pin, the shell comprising:

a casing having a two-stage recess therein for receiving the first pin, the two-stage recess including a first stage and a second stage, wherein the first stage is closer to a face of the casing than the second stage;

wherein a distal end, relative to the face of the casing, of the first stage of the two-stage recess forms a flat shoulder surface that corresponds to the shoulder surface of the first pin, the shoulder surface of the first stage being placed against the shoulder surface of the first pin thereby setting a minimal distance between the two-stage recess and the base of the pin;

wherein the perimeter of the second portion of the first pin does not fit snugly against a lateral wall of said first stage such that a gap is formed therebetween;

wherein a distal end, relative to the face of the casing, of the second stage is deeper than the distal end of the first stage; and wherein the perimeter of the first portion of the first pin fits snugly against a lateral wall of said second stage such that substantially no gap is formed therebetween, thereby fixing a position of the first stage in a plane parallel to the shoulder surface of the pin.

6. A magnetic tape cassette shell as in claim 5, wherein:

the second positioning pin of the record/playback device has a flat distal end substantially coplanar with the shoulder surface of the first pin;

the magnetic cassette shell also having a one-stage recess, a distal end, relative to the face of the casing, of the one-stage recess forming a flat surface that corresponds to the flat distal end of the second pin;

the flat surface of the one-stage recess being placed against the flat distal end of the second pin thereby fixing a minimal distance between the two-stage recess and the base of the pin.

* * * * *